United States Patent
Burns et al.

(10) Patent No.: US 6,510,505 B1
(45) Date of Patent: Jan. 21, 2003

(54) SYSTEM AND METHOD FOR ALLOCATING STORAGE SPACE USING BIT-PARALLEL SEARCH OF BITMAP

(75) Inventors: Randal Chilton Burns, Sunnyvale, CA (US); Wayne Curtis Hineman, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 09/851,766

(22) Filed: May 9, 2001

(51) Int. Cl.[7] .............................................. G06F 12/00
(52) U.S. Cl. ......................... 711/170; 711/111; 707/205
(58) Field of Search ................................ 711/111, 170; 707/205

(56) References Cited

U.S. PATENT DOCUMENTS

| | | | | |
|---|---|---|---|---|
| 5,715,455 A | * | 2/1998 | Macon et al. | 360/72.1 |
| 6,175,900 B1 | * | 1/2001 | Forin et al. | 711/156 |
| 6,185,663 B1 | * | 2/2001 | Burke | 711/156 |

OTHER PUBLICATIONS

Wilson et al. "Dynamic Storage Allocation : A Survey and Critical Review" Proc 1995 Int'.*
McKusick et al. "A Fast File System for UNIX" ACM Trans. on Computer Systems, vol. 2, No. 3, Aug. 1984, p. 181–197.*
Navarro et al. "Fast and Flexible String Matching by Combining Bit–parallelism and Suffix Automata", Proc. of the 9th Annual Symposium on Combinatorial Pattern Matching, 1998.*
Tanenbaum et al. "Operating Systems: Design and Implementation", 1997 Prentice Hall, Second Edition p. 805–821 esp. routines alloc_zone and alloc_bit.*

* cited by examiner

*Primary Examiner*—Do Hyun Yoo
*Assistant Examiner*—Paul Baker
(74) *Attorney, Agent, or Firm*—John L. Rogitz

(57) ABSTRACT

A bit-parallel system and method for allocating storage space for data objects using a bitmap. It is determined whether a suffix of free space bits in a previous bitmap word can be used with a prefix of free space bits in a current word that is contiguous to the previous word. If so, this renders a string of free space bits spanning multiple words, and it is determined whether the string represents a sufficiently large number of contiguous blocks ("the target") to store the data object. If not, it is determined whether sufficient contiguous free space bits in the current word exist to fulfill the target. If the target still can't be achieved, the longest suffix of free space bits in the current word is found for possible use with the prefix of the next contiguous word, and the next word is then retrieved and processed. The algorithm for finding the suffix preferably is undertaken by considering bits in parallel.

14 Claims, 3 Drawing Sheets

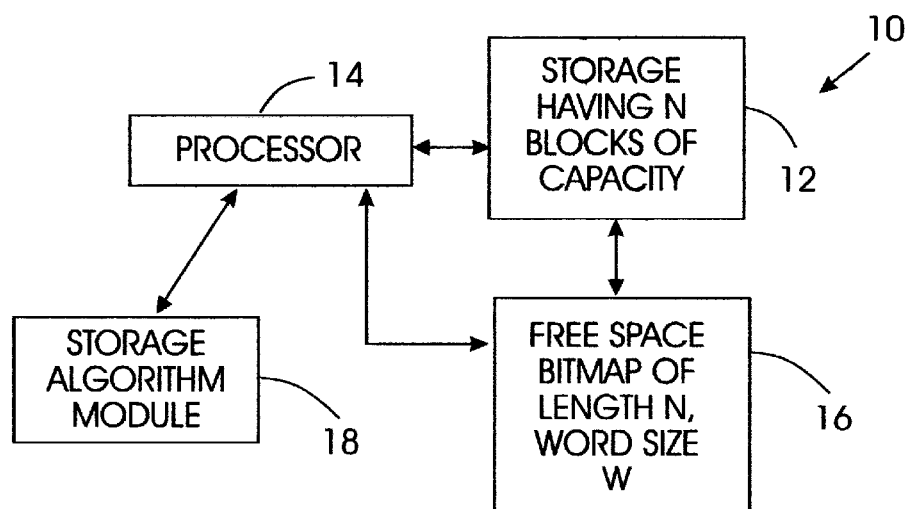
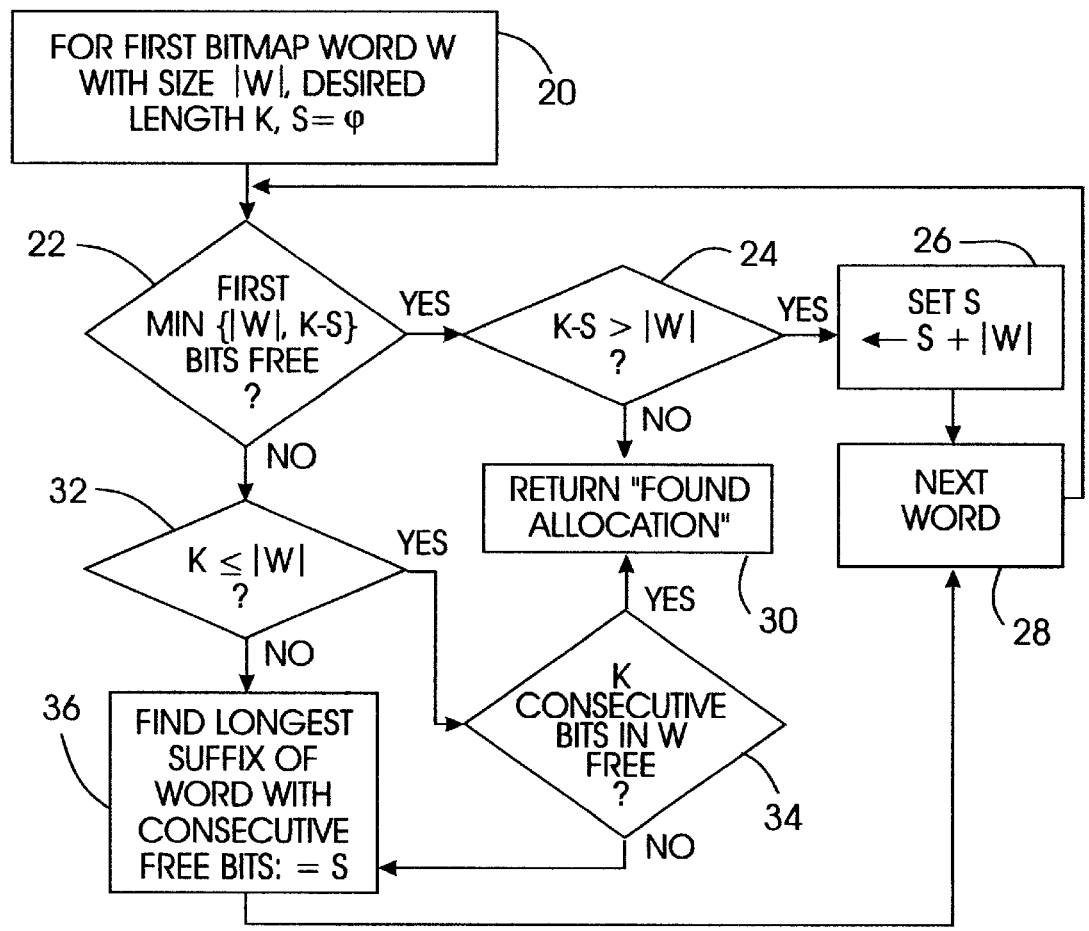
FIG. 1
FIG. 2

FIG. 3

| | | | | | | | | | | | | | | Shift | Gap Size |
|---|---|---|---|---|---|---|---|---|---|---|---|---|---|---|---|
| a₀ | a₁ | a₂ | a₃ | a₄ | a₅ | a₆ | a₇ | a₈ | a₉ | a₁₀ | a₁₁ | a₁₂ | ⋯ a|W|-1 | | 1 |
| ∧ 0 | a₀ | a₁ | a₂ | a₃ | a₄ | a₅ | a₆ | a₇ | a₈ | a₉ | a₁₀ | a₁₁ | ⋯ a|W|-2 | 1 | |
| b₁ | b₂ | b₃ | b₄ | b₅ | b₆ | b₇ | b₈ | b₉ | b₁₀ | b₁₁ | b₁₂ | ⋯ b|W|-1 | | | 2 |
| ∧ 0 | 0 | b₁ | b₂ | b₃ | b₄ | b₅ | b₆ | b₇ | b₈ | b₉ | b₁₀ | ⋯ b|W|-3 | | 2 | |
| 0 | 0 | 0 | c₃ | c₄ | c₅ | c₆ | c₇ | c₈ | c₉ | c₁₀ | c₁₁ | c₁₂ | ⋯ c|W|-1 | | 4 |
| ∧ 0 | 0 | 0 | 0 | 0 | 0 | 0 | c₃ | c₄ | c₅ | c₆ | c₇ | c₈ | ⋯ c|W|-7 | 4 | |
| 0 | 0 | 0 | 0 | 0 | 0 | 0 | d₇ | d₈ | d₉ | d₁₀ | d₁₁ | d₁₂ | ⋯ d|W|-1 | | 8 |
| ∧ 0 | 0 | 0 | 0 | 0 | 0 | 0 | 0 | d₇ | d₈ | d₉ | d₁₀ | d₁₁ | ⋯ d|W|-8 | 1 | |
| 0 | 0 | 0 | 0 | 0 | 0 | 0 | 0 | e₈ | e₉ | e₁₀ | e₁₁ | e₁₂ | ⋯ e|W|-1 | | 9 |

$W(0)$ ... 00000000011111111
... 00000000011111111

$W(1)$ ... 00000000011111111
... 00000000000011111

$W(2)$ ... 00000000000011111
... 00000000000000001

$W(3)$ ... 00000000000000001
... 00000000000000000

$W(4)$ ... 00000000000000000

(a) Suffix = 8

$W(0)$ ... 00011111111111111
... 00001111111111111

$W(1)$ ... 00001111111111111
... 00000011111111111

$W(2)$ ... 00000011111111111
... 00000000000111111

$W(3)$ ... 00000000000111111
... 00000000000000000

$W(4)$ ... 00000000000000000

(b) Suffix = 13

$W(0)$ ... 01111111111111111
... 00111111111111111

$W(1)$ ... 00111111111111111
... 00001111111111111

$W(2)$ ... 00001111111111111
... 00000000111111111

$W(3)$ ... 00000000111111111
... 00000000000000000

$W(4)$ ... 00000000000000000

(C) Suffix = 15

FIG. 4
EXAMPLES OF THE SUFFIX FINDING ROUTINE

SYSTEM AND METHOD FOR ALLOCATING STORAGE SPACE USING BIT-PARALLEL SEARCH OF BITMAP

BACKGROUND OF THE INVENTION

1. Field of the Invention

The present invention relates to data storage systems that allocate storage space using bitmaps.

2. Description of the Related Art

Storage systems, particularly systems that store data objects contiguously, often use bitmaps to represent and manage free space. Typically, the value of each bit in a bitmap represents whether a unit of storage, e.g., a block, is free. A bit value of "1" in a free space bitmaps indicates that the block associated with the bit is free, and a value of "0" indicates that the block is not free. Of course, a used space bitmap would reverse the free/not free values.

Larger storage systems require larger bitmaps, with some bitmaps potentially including many pages. Each page in turn includes many "words" of bits, with the word size being a power of two and generally being equal to the register width of the processor being used, e.g., 16 bits, 32 bits, 64 bits, and so on. Thus, a processor can read up to the word size number of bits in parallel. When it is time to allocate free space for a data object to be stored, the allocation processor searches the bitmap for a sequence of bits that represents free space which is sufficiently large to store the object.

Bitmaps have several advantages over other management tools such as so-called "extent lists" and the "buddy system" disclosed by Knuth in *The Art of Computer Science,* Vol. 1. For instance, bitmaps have the advantage of two-way addressing, meaning that the block address of managed space can be used to locate the corresponding bit address in the bitmap and vice-versa. This makes the "liberation" of space which is no longer required for storage relatively simple, and it also makes it relatively simple to extend an existing allocation in place. Moreover, bitmaps are self organizing, in that searching for a range of storage is localized to the respective bits in the bitmap that represent the range of storage. Extent lists and buddy systems, in contrast, can become disorganized. Still further, bitmaps are inherently parallel, with one performance advantage over extent lists being that relatively simple latches can be used to synchronize multiple processes over bitmaps, whereas extent lists require the use of more complex locks. Additionally, while the buddy system can quickly find strings of bits representing free space ("gaps"), the gaps are constrained to be aligned with power of 2 boundaries, which often results in undesirably splitting larger gaps into plural smaller gaps. This is not as robust as being able to exploit gaps of any size, and at any offset from a reference, a possibility the present invention understands is provided for by bitmaps.

However, the present invention observes that searching bitmaps for data object allocation purposes can be inefficient. For instance, a linear search of a bitmap requires a fixed number of steps to examine each bit, increasing the time it takes to find an allocation. Also, previous systems such as the GPFS/Tiger Shark file system look in only a single bitmap word for an allocation. As recognized herein, some data objects might be sufficiently large to require an allocation that cannot be represented by a single bitmap word. Moreover, by limiting an allocation to spaces represented in only a single bitmap word, an allocation that might span multiple contiguous words that together have a contiguous string of free space bits cannot be considered. The invention disclosed herein addresses one or more of the critical observations set forth above.

SUMMARY OF THE INVENTION

A general purpose computer is programmed according to the inventive steps herein to manage storage space in a storage system. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

The invention can be implemented by a computer system including a data storage system having a bitmap of bits representing free and used space on a data storage medium, and a processor associated with a data storage system. The processor has logic for receiving a size of an object to be stored, with the size establishing a target number "k" of bits in the bitmap. The processor also has logic for, in a first word of bits in the bitmap, determining a suffix sequence of bits when all bit values in the suffix sequence are a predetermined value. In a second word of bits in the bitmap, the processor logic determines a prefix sequence of bits when all bit values in the prefix sequence are the predetermined value. The logic of the processor returns an allocation for the object when the length of the prefix and suffix together equals at least the target number "k" of bits.

In another aspect, a computer program device includes a computer program storage device that is readable by a processor. A program is on the program storage device and includes instructions which can be executed by the processor for using a bitmap to allocate space in a data storage system. The program includes computer readable code means for identifying a contiguous number of bits in the bitmap when each bit in the contiguous number has a predetermined value and when the number of bits in the contiguous number is at least as great as a target number "k" of bits. The contiguous number of bits span more than a single word in the bitmap.

In still another aspect, a computer-implemented method for identifying a target number "k" of storage blocks using a bitmap including words of "w" bits each includes identifying, in a first word or words, a suffix having "s" contiguous bits. Each bit has a predetermined value, e.g., "high". The method also includes identifying, in a second word or words contiguous to or near the first word or words, a prefix having "p" contiguous bits. Each bit in the prefix has the predetermined value, and "p" and "s" together equal at least "k".

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic diagram showing the system of the present invention;

FIG. 2 is a flow chart showing the present logic;

FIG. 3 is a table illustrating the operation of the gap search routine in a preferred implementation of the logic of FIG. 2; and FIG. 4 is a table that displays the results of the preferred gap search algorithms.

DETAILED DESCRIPTION OF THE PREFERRED EMBODIMENTS

Referring initially to FIG. 1, a system is shown, generally designated 10, for allocating data storage blocks on a data storage medium 12 having "N" total blocks of capacity. As set forth more fully below, a processor 14 associated with the system 10 uses a bitmap of length "N" and word size "w", also symbolized herein as |W|, in accordance with a storage algorithm module 18 to find a target number "k" of contiguous blocks in the storage medium 12 for storing a data object requiring the target number "k" of blocks. Each bit in the bitmap 16 represents a block in the storage 12 and indicates whether the block is free or not.

The system 10 can be a file system, database system, or other system that must allocate space for variable-sized data objects. The bitmap 16 can be free space bitmap, in which case bits having values of "1" indicate that the associated blocks in the storage 12 are free, or the bitmap 16 can be a used space bitmap, in which case bits having values of "0" indicate that the associated blocks in the storage 12 are free. Bits in the bitmap 16 are grouped into words, each having a word size "w", i.e., each word has "w" bits in it. The word size "w" is generally equal to the register size of the processor 14.

In one intended embodiment, the processor 14 (computer) of the present invention may be a personal computer made by International Business Machines Corporation (IBM) of Armonk, N.Y., or the computer may be any computer, including computers sold under trademarks such as AS400, with accompanying IBM Network Stations.

The flow charts herein illustrate the structure of the logic embodied by the module 18 and executed by the processor 14 as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the flow charts may be embodied in a computer program that is executed by a processor as a series of computer-executable instructions. These instructions may reside, for example, in a program storage device of the system 10. The program storage device may be RAM, or a magnetic or optical disk or diskette, DASD array, magnetic tape, electronic read-only memory, or other appropriate data storage device. In an illustrative embodiment of the invention, the computer-executable instructions may be lines of compiled C++ compatible code.

FIG. 2 shows the logic of present invention. Commencing at block 20, when a request is received to store a data object requiring "k" contiguous blocks, with "k" accordingly being a target number of "k" contiguous bits in the bitmap 16, a loop is entered for the first bitmap word having a word size "w" and an initial suffix length "s" of zero. Proceeding to decision diamond 22, it is determined whether each one of the first "M" bits of the word have a predetermined value, e.g., a high value of "1" when the bitmap 16 is a free space bitmap. Per the present invention, "M" is the lesser of the word size "w" and the difference between the target number "k" and the suffix size "s".

When the test at decision diamond 22 is positive, the logic moves to decision diamond 24 to determine whether the difference between the target number "k" and the suffix size "s" is larger than the word size "w". It is to be understood that the determination made at decision diamond 24 can be undertaken by determining whether [k−s] is greater than w or by determining whether w is less than or equal to [k−s]. For the first word, the suffix size "s" is zero and, assuming a relatively large object is to be stored, it is likely that the difference between the target number "k" and the suffix size "s" will be larger than the word size "w". The logic accordingly will proceed to block 26, wherein the new suffix size "s" is set to the current suffix size "s" plus the word size "w". The next word (i.e., the word that is contiguous to the word under test) is retrieved at block 28, and the process loops back to decision diamond 22. In contrast, if the difference between the target number "k" and the suffix size "s" is not larger than the word size "w", the logic moves from decision diamond 24 to block 30 to return "found allocation" in any suitable manner known in the art by identifying, returning, or otherwise indicating which string of contiguous blocks in the storage 12, as represented by a string of contiguous "free" bits in the bitmap 16, are free for storing the object.

Returning to decision diamond 22, when each one of the first "M" bits of the word under test do not have the predetermined value, the logic proceeds to decision diamond 34. At decision diamond 34, it is determined whether the target number "k" is less than or equal to the word size "w", i.e., whether, failing the first loop represented by states 22–28, the object sought to be stored is sufficiently small to be stored in blocks represented by the bits of the single bitmap word under test. If so, the logic moves to decision diamond 34 to identify whether any "k" consecutive bits in the word under test all have the "free" value, and if so the allocation is returned at block 30.

Failing both of the first two logical loops, however, the process next moves to block 36, which essentially represents a third logical loop. At block 36, for the word under test the longest suffix is found of consecutive (contiguous) "free" bits, and the number of bits in this suffix is set equal to the suffix size "s". The logic then retrieves the next word at state 28, and then loops back to decision diamond 22. In this way, "free" bits in contiguous words can be stitched together to form an allocation.

The above algorithm can be undertaken by examining the bits of a word serially or in parallel. For performance reasons, the parallel method is preferred. Accordingly, a particularly preferred implementation that undertakes the logic of FIG. 2 is set forth below, using the following terminology. A variable "p" is the prefix length in the current word under test that is required to reach the target number "k". A page of the bitmap is labelled "W". The page consists of a series of words, $W=W^1, W^2, W^n$, each of size |W|, so that the processor 14 can conduct logical and arithmetic operations against words of size |W| in unit time.

For ease of understanding bit operations and displaying bitmap contents in debuggers and programs, the algorithms below are in a big-endian memory (most significant byte first) with the bitmap bits being ordered so that they are sequential and increasing. Bitmap bits that have adjacent indices are adjacent in memory, which facilitates viewing and debugging bitmap contents. Also, in the big-endian format the left and right shift operators (<< and >>) correspond to left and right shifts in registers and memory. Note that the shift operators are specified to shift registers towards the most and least significant bit, not necessarily to the left and right physically.

With the above in mind, the step of determining whether a prefix of a word under test, when added to the suffix of the previous word, equals the target "k" (i.e., the first loop of FIG. 2), can be undertaken by direct calculation.

Specifically, given the target "k" and suffix of the previous word of length "s", the prefix length "p" must be of length p=k−s to fulfill the requested allocation. To check for a length "p" prefix in word $W^i$, for any "p" less than $|W|$, it is determined whether (1'>>p)∨$W^i$=1', where 1' indicates a word containing all free bits (high bits in a free space bitmap). If true, an allocation has been found at the target size starting at offset $|W|$−(s mod $|W|$) in word $W^{i-(\lceil s/|W|\rceil)}$. The suffix "s" can be much larger than $|W|$, so that the allocation spans many words. By shifting the vector of all ones right by "p" in the above equation, the algorithm creates the string of "p" zeros followed by $|W|$ ones. The whole expression evaluates to "true" only when the first "p" bits of $W^i$ are ones—the desired prefix. As discussed above in relation to FIG. 2, if the expression evaluates false and if k<$|W|$, the algorithm continues with the next step to find a sequence of consecutive ones within the current word. Alternatively, as also described above and shown in FIG. 2, if "k" too large to fit within a single word (k≧$|W|$), searching within the word is not undertaken, and the third loop is entered at block 36 to find a new suffix.

For any prefix "p" larger than $|W|$, targets larger than $|W|$ require an allocation across multiple words. The present invention determines whether the current word describes available space, i.e., whether $W^i$=1', and can thus contribute to the allocation. If so, as disclosed above "s" is incremented by the word size and the prefix search is undertaken on the next word.

With respect to how the preferred algorithm undertakes the second loop of FIG. 2—finding allocations smaller than $|W|$ that are contained within a given word—the algorithm uses bit-parallel search techniques. In greater detail, if an allocation of the target size exists, it starts at some offset between 0 and $|W|$−k in word $W^i$. To find the allocation, the algorithm repeatedly shifts and "ands" the word, using the word and word-wide processor primitives to compute intermediate results at all bit offsets concurrently. This portion of the algorithm can be referred to as the "gap search" portion. FIG. 3 illustrates the operation of the gap search for an allocation of size 9. The algorithm proceeds in rounds. In each round, the algorithm shifts the result and "ands" the shifted value with the previous result.

To search for a gap of size "k", the preferred method conducts lg(k) rounds, with each round shifting the bits minimum($2^R$, k−$2^R$), wherein "R" is the number of the round from zero to $\lceil \log_2(k)\rceil$−1. In the example shown above in FIG. 3, the algorithm conducts lg(9)=4 rounds with shifts of 1, 2, 4, and (1=9−$2^3$).

The "gap size" column describes how large a contiguous gap each bit in the word represents. As the skilled artisan will appreciate, for the original word ($a_1$, $a_2$, . . . ), each bit corresponds to a unit allocation gap. For later rounds, looking at FIG. 3 clarifies the "gap size". The bit $d_9$ summarizes eight bits in the original word.

$d_9 = c_5 \wedge c_9$
$= b_3 \wedge b_5 \wedge b_7 \wedge b_9$
$= a_2 \wedge a_3 \wedge a_4 \wedge a_5 \wedge a_6 \wedge a_7 \wedge a_8 \wedge a_9$ Since $d_9$ is a conjunction of values from the previous rounds, a $d_9$ value of one represents a string of eight consecutive ones in the original word. To calculate the "gap size" for a round, the "shift" is added to the previous "gap size". At the end of the search, the "gap size" always equals the target number "k".

At the termination of the gap search routine, the presently preferred parallel algorithm evaluates whether a suitable gap exists and locates the bit offset of such a gap. If no gap exists, the algorithm continues to the third loop of FIG. 2, i.e., to calculate a suffix. Any high bit in the result word (W(R)) indicates that an allocation of the target size can be made in the original word. To test this, the algorithm merely evaluates if W(R)=0. For non-zero final result words, to find the offset of the first high bit in the result word, the algorithm performs binary search as indicated in the following pseudocode:

offset=0;
    size=$|W|$/2;
    do {
        mask=(1'<<$|W|$−size))>>offset;
        if (mask ∧ W(R)==0) {
            offset+=size;
        }
        size=size/2
    } while (size≧1)
    return offset;

The above search algorithm finds the leftmost high bit, corresponding to the first gap in which the target length can be allocated. The routine returns an offset which corresponds to the end of the found gap. To locate the start offset, the gap size less one is then subtracted.

The way the preferred parallel algorithm undertakes the final loop of FIG. 2—finding the suffix—is shown below in pseudocode:

size=0;
    round=L;
    do {
        if ( 0x01 ^(W(round)>>size)) {
            size+=$2^{round}$;
        }
        round−=1;
    } while ( round>=0);
    return size;

The above routine for finding the suffix size draws on the same concepts and reuses the results computed in the gap search routine. If the algorithm just completed the gap search routine, the result words are reused. Labelling these words by round, i.e. W(0) is the original word and W(R) the result of round R. If these results are not available because the algorithm came directly from the prefix routine, result words W(R) are computed using ½$|W|$ as the target size.

As the skilled artisan will appreciate from the above pseudocode, the suffix finding routine searches backwards through the rounds using already computed values to extend the known length of the suffix. The routine starts by considering the result of the latest round with a high rightmost bit. For notation, the latest round with a high rightmost bit is referred to as W(L). The $n^{th}$ bit within W(L) is indicated by $W(L)_n$. Similarly, the last bit is $W(L)_{|W|-1}$. The following example illustrates the suffix finding routine.

Assume the gap search algorithm looked for, but did not find, a target of 16 for the rightmost bits of three different words, with suffixes of 8, 13, and 15. Call these examples E8, E13 and E15, respectively. FIG. 4 displays the results of the gap search algorithms for the rightmost 16 bits for each of the three original words. The bits that the suffix algorithm considers in each word are underlined. For all three examples, the rightmost bit of W(3) equals one, implying that all three words have a suffix of at least 8. In all cases, the algorithm shifts its focus, indicated by the underlined bit, to the previous round W(2) and 8 bits to the left. The algorithm next examines bit $W(2)_{|W|-9}$, which is high for examples E15 and E13, and low for E8. Since each bit in W(2) represents a gap of size 4, the known suffix length increases to 12 for examples E13 and E15. For E8 the known length stays at 8.

As shown in FIG. 4, upon encountering a low bit, like E8 does, the focus of the algorithm shifts to the previous round, but remains at the same bit offset. For the remainder of its rounds, E8 remains at known suffix length 8.

For E13 and E15, on the other hand, the focus shifts four bits to the left and to the previous round ($W(1)_{|W|-13}$) This is where examples E13 and E15 diverge. Bits in round 1 represent gaps of size 2 and the known length of the E15 grows by this to 14. Example E13 has a low bit, cannot grow to 14, and consequently stays at known length of 12.

In the final round, E15 again shifts it focus, this time two bits to the left, and E13 remains on the same bit, only changing its round. Both examples find a high bit and increase their known length by one. The suffix routine terminates after examining the original word W(0), having found suffixes of size 8, 13, and 15 respectively.

The suffix finding algorithm shown in the second of the above-disclosed pseudocode routines works backwards through the results words of the gap search algorithm to determine the length of the suffix. It starts with round R(L), which is the highest round with a high rightmost bit, i.e. $W(L)_{|W|}=1$. The rightmost bit in round L indicates that the available suffix has minimum size $2^L$. Moreover, the suffix is smaller than $2^{L+1}$, because the rightmost bit in W(L+1)is low. Accordingly, the shift in round L is always a full shift (size $2^L$ rather than $k-2^L$) so that bits represent gaps of length $2^L$.

The algorithm iteratively refines the possible length of the suffix by looking in lower rounds. In round L−1, if bit $W(L-1)_{|W|-2^L-1}$ is high, the suffix is at least $2^L+2^{L+1}=3(2^{L-1})$ in length, and if it is low, the suffix is at most $3(2^{L-1})-1$ in length. The bit $W(L-1)_{|W|-2^L-1}$ represents the $2^{L-1}$ contiguous bits that precede the current 2' bits of the suffix.

While the particular SYSTEM AND METHOD FOR ALLOCATING STORAGE SPACE USING BIT-PARALLEL SEARCH OF BITMAP as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

We claim:

1. A computer system, comprising:
    a data storage system having a bitmap of bits representing at least free space on a data storage medium; and
    at least one processor associated with a data storage system, the processor having logic for undertaking method acts comprising:
        receiving at least a size of an object to be stored, the size establishing a target number "k" of bits in the bitmap;
        operating on bits in parallel, in a first word of bits in the bitmap, determining a suffix sequence of bits when all bit values in the suffix sequence are a predetermined value;
        in a second word of bits in the bitmap, determining a prefix sequence of bits when all bit values in the prefix sequence are the predetermined value; and
        returning an allocation for the object when the length of the prefix and suffix together equals at least the target number of bits.

2. The system of claim 1, wherein each word defines a word size "w", and the method acts undertaken by the logic further include:
    (a) determining whether each one of a first number of bits in a word has the predetermined bit value, the first number being the minimum of: the word size "w", and the difference between the target number "k" and a suffix size "s";
    (b) if each one of the first number of bits has the predetermined bit value, determining whether the difference between the target number "k" and suffix size "s" is greater than the word size "w", and if so,
    (c) setting the suffix size "s" to be equal to the suffix size "s" plus the word size "w", and otherwise returning "found allocation".

3. The system of claim 2, wherein the method acts undertaken by the logic further include:
    (d) when the difference between the target number "k" and suffix size "s" is greater than the word size "w", retrieving the next contiguous word in the bitmap and repeating acts (a)–(c).

4. The system of claim 2, wherein the method acts undertaken by the logic further include:
    (e) when it is determined at act (a) that the first number of contiguous bits is not in the word, determining whether the target number "k" is greater than the word size "w", and if so,
    (f) finding a longest suffix of consecutive bits each of which bits has the predetermined value, the longest suffix defining a suffix size, and then retrieving a next word in the bitmap and repeating acts (a)–(c);
    (g) when it is determined at act (e) that the target number "k" is not greater than the word size "w", determining whether each one of "k" consecutive bits in the word has the predetermined value, and if so, returning "found allocation", and otherwise undertaking act (f).

5. A Computer program device comprising:

A computer program storage device readable by a processor; and

A program on the program storage device and including instruction executable by the processor for using a bitmap to allocate space in a data storage system, the program comprising:
    Computer readable code means for identifying in parallel a contiguous number of bits in the bitmap when each bit in the contiguous number has a predetermined value and when the number of bits in the contiguous number is at least as great as target number of "k" bits, the contiguous number of bits spanning more than a single word in the bitmap.

6. The computer program device of claim 5, wherein the target number of bits "k" is established by the size of an object to be stored.

7. The computer program device of claim 6, further comprising:

computer readable code means for determining a suffix sequence of bits in a first word of bits in the bitmap when all bit values in the suffix sequence are a predetermined value;

computer readable code means for determining a prefix sequence of bits in a second word of bits in the bitmap when all bit values in the prefix sequence are the predetermined value, the first and second words being contiguous to each other; and computer readable code means for returning an allocation for the object when the length of the prefix and suffix together equals at least the target number "k".

8. The computer program device of claim 7, wherein each word defines a word size "w", and the device further comprises:

computer readable code means for determining whether each one of a first number of bits in a word has the predetermined bit value, the first number being the minimum of: the word size "w", and the difference between the target number "k" and a suffix size "s";

computer readable code means for, if the first number of bits have the predetermined bit value, determining whether the difference between the target number "k" and suffix size "s" is greater than the word size "w"; and computer readable code means for setting the suffix size "s" to be equal to the suffix size "s" plus the word size "w" when the difference between the target number "k" and suffix size "s" is greater than the word size "w".

9. The computer program device of claim 8, wherein the device further includes:

computer readable code means for, when the difference between the target number "k" and suffix size "s" is greater than the word size "w", retrieving the next contiguous word in the bitmap.

10. A computer-implemented method for identifying a target number of "k" storage blocks using a bitmap including words of "w" bits, comprising:

Identifying in parallel, in at least a first word or words, a suffix having "s" contiguous bits, each having a predetermined value; and Identifying, in at least a second word or words contiguous to or near the first word or words, a prefix having "p" contiguous bits, each having the predetermined value, wherein "p" and "s" together equal at least "k".

11. The method of claim 10, wherein the act of identifying a prefix is accomplished by considering the bits of a word directly.

12. The method of claim 10, wherein each word defines a word size "w", and the method further comprises:

(a) determining whether each one of a first number of bits in a word has the predetermined bit value, the first number being the minimum of: the word size "w", and the difference between the target number "k" and a suffix size "s";

(b) if each one of the first number of bits has the predetermined bit value, determining whether the difference between the target number "k" and suffix size "s" is greater than the word size "w", and if so, (c) setting the suffix size "s" to be equal to the suffix size "s" plus the word size "w", and otherwise returning "found allocation".

13. The method of claim 12, wherein the method further comprises:

(d) when the difference between the target number "k" and suffix size "s" is greater than the word size "w", retrieving the next contiguous word in the bitmap and repeating acts (a)–(c).

14. The method of claim 12, wherein the method acts further comprise:

(e) when it is determined at act (a) that the first number of contiguous bits is not in the word, determining whether the target number "k" is greater than the word size "w", and if so, (f) finding a longest suffix of consecutive bits in the word each of which bits has the predetermined value, the longest suffix defining a suffix size, and then retrieving a next word in the bitmap and repeating acts (a)–(c);

(g) when it is determined at act (e) that the target number "k" is not greater than the word size "w", determining whether each one of "k" consecutive bits in the word has the predetermined value, and if so, returning "found allocation", and otherwise undertaking act (f).

* * * * *